United States Patent
Mori et al.

(10) Patent No.: US 8,410,646 B2
(45) Date of Patent: Apr. 2, 2013

(54) MOTOR DAMPING STRUCTURE FOR ACTUATOR DEVICE

(75) Inventors: Kazuaki Mori, Saitama (JP); Hideyuki Takahashi, Saitama (JP); Kaoru Tanaka, Tochigi (JP); Tomohiro Kawabata, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 274 days.

(21) Appl. No.: 12/917,529

(22) Filed: Nov. 2, 2010

(65) Prior Publication Data

US 2011/0121667 A1   May 26, 2011

(30) Foreign Application Priority Data

Nov. 20, 2009   (JP) ................. 2009-265423

(51) Int. Cl.
 *H02K 5/24*   (2006.01)
 *H02K 5/04*   (2006.01)
(52) U.S. Cl. .............. 310/51; 310/89; 310/91; 248/632; 248/672
(58) Field of Classification Search .................... 310/50, 310/51, 89, 91; 248/638, 671–672
See application file for complete search history.

(56) References Cited

U.S. PATENT DOCUMENTS

| | | | | | |
|---|---|---|---|---|---|
| 2,717,748 | A | * | 9/1955 | Martinet | 248/634 |
| 3,143,284 | A | * | 8/1964 | Lindsjo et al. | 417/363 |
| 4,171,190 | A | * | 10/1979 | Hudson | 417/350 |
| 5,068,555 | A | * | 11/1991 | Oberdorfer-Bogel | 310/52 |
| 5,397,950 | A | * | 3/1995 | Norbury et al. | 310/91 |
| 5,521,447 | A | * | 5/1996 | Bertolini et al. | 310/51 |
| 5,769,382 | A | * | 6/1998 | Kobayashi et al. | 248/638 |
| 6,158,978 | A | * | 12/2000 | Norbury, Jr. | 417/350 |
| 7,040,520 | B2 | * | 5/2006 | Turk | 227/10 |
| 2004/0032177 | A1 | * | 2/2004 | Nitzsche et al. | 310/91 |

FOREIGN PATENT DOCUMENTS

JP   2004-159475 A   6/2004

* cited by examiner

*Primary Examiner* — Burton Mullins
(74) *Attorney, Agent, or Firm* — Global IP Counselors, LLP (57) ABSTRACT

A motor damping structure for an actuator device includes a motor housing and a casing. The motor housing includes a drive motor therein. The casing includes an upper actuator case and a lower actuator case to accommodate the motor housing therebetween, the casing including a motor support section formed integrally in at least one of the upper actuator case and the lower actuator case to support the drive motor by contacting an outside surface of the motor housing. The motor support section has an elastic contacting member protruding from the at least one of the upper actuator case and the lower actuator case to contact one of an upper slanted surface and a lower slanted surface of the motor housing.

7 Claims, 8 Drawing Sheets

CROSS-SECTIONAL VIEW ALONG B-B

MOTOR DAMPING STRUCTURE FOR ACTUATOR DEVICE

CROSS-REFERENCE TO RELATED APPLICATIONS

This application is a divisional application of Japanese Patent Application No. 2009-265423 filed on Nov. 20, 2009. The entire disclosure of Japanese Patent Application No. 2009-265423 is hereby incorporated herein by reference.

BACKGROUND

1. Field of the Invention

The present invention generally relates to a motor damping structure for an actuator device used in an automobile or other vehicle, particularly a motor damping structure for an actuator device having excellent durability.

2. Background Information

Figure 13:
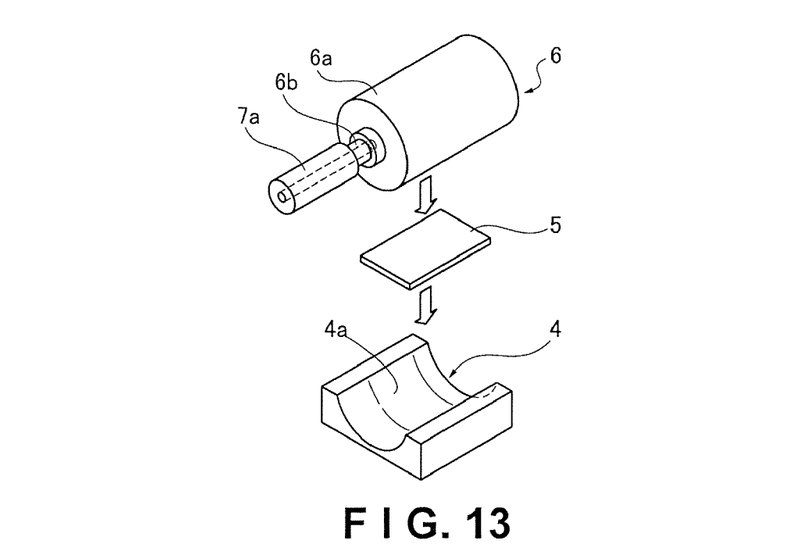
FIG. 13 is a simplified exploded perspective view illustrating constituent features of a conventional actuator device.
Figure 14:
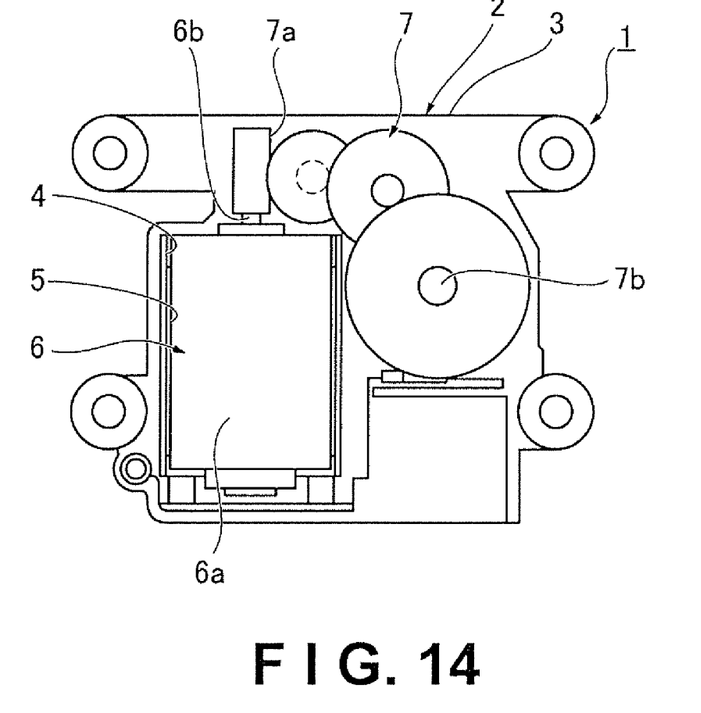
FIG. 14 illustrates an arrangement of components inside a lower case of a conventional actuator device.
Figure 15:
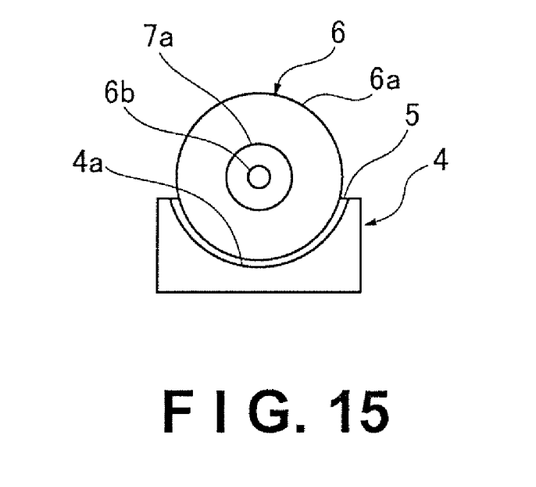
FIG. 15 is a simplified frontal view illustrating constituent features of motor support section of a conventional actuator device.

FIGS. 13 to 15 show a known motor damping structure for an automobile actuator device according to a conventional technology.

First, the constituent features of an actuator device 1 and motor damping structure according to the conventional technology will be explained. A hollow box-like casing 2 is made chiefly of a resin material and combines an upper actuator case (not shown in the drawings) a lower actuator case 3 like that shown in FIG. 14.

A motor supporting recess 4 for supporting a drive motor 6 is formed inside the lower actuator case 3 of the casing 2, and a motor housing 6a of the drive motor 6 is fixed to a tape mounting surface 4a of the motor support recess with an adhesive tape 5 as shown in FIG. 13.

A worm gear 7a of a reduction gear section 7 serving as a power transmitting section is provided on a motor shaft 6b of the drive motor 6 such that a torque of the drive motor 6 can be transmitted.

An output shaft 7b of the reduction gear section 7 is provided such that it protrudes outward from an upper face section of the upper actuator case (not shown) of the casing 2 and is connected to a driven member.

Next, operational effects of the motor damping structure for an actuator device according to the conventional technology will be explained.

In a motor damping structure for an actuator device according to the conventional technology, the motor housing 6a of the drive motor 6 is fixed to the tape mounting surface 4a of the motor support recess 4 with the adhesive tape 5.

When the motor shaft 6b of the drive motor 6 is driven (rotated) in accordance with a control section (not shown), the rotational direction and rotational angle of the output shaft 7b is changed by the reduction gear section 7 and the driven member is moved to a desired position.

Dimensional tolerances between the motor housing 6a and the tape mounting surface 4a and vibrations generated when the drive motor 6 rotates are absorbed by elastic deformation of the adhesive tape 5 in the thickness direction of the adhesive tape 5.

A configuration in which a drive motor 6 is fixed inside a casing 2 such that a periphery of a bearing section of the motor housing 6a is supported is also known (e.g., see Japanese Laid-Open Patent Publication No. 2004-159475).

SUMMARY

With an actuator device 1 and motor damping structure according to the conventional technology, when the actuator device 1 is assembled, the motor housing 6a of the drive motor 6 is fixed to the tape mounting surface 4a of the motor support recess 4 with the adhesive tape 5.

Consequently, extra work is required because it is necessary to include a processing step for peeling the adhesive tape 5 from a backing and attaching it to the motor support recess 4 of the motor housing 6a.

Also, since the adhesive tape 5 adds to the number of parts and the backing becomes a discarded material, which is less environmentally friendly, managing the parts of the device becomes more complex.

Consequently, the manufacturing cost increases and is difficult to suppress.

Therefore, an object of the present invention is to provide a motor damping structure for an actuator device that is easy to assemble, enables a manufacturing cost to be reduced, provides good support stability after it is assembled, and maintains a vibration damping effect for a long period of time.

In order to achieve the aforementioned object, a motor damping structure for an actuator device according to one aspect includes a motor housing and a casing. The motor housing includes a drive motor therein. The casing includes an upper actuator case and a lower actuator case to accommodate the motor housing therebetween, the casing including a motor support section formed integrally in at least one of the upper actuator case and the lower actuator case to support the drive motor by contacting an outside surface of the motor housing. The motor support section has an elastic contacting member protruding from the at least one of the upper actuator case and the lower actuator case to contact one of an upper slanted surface and a lower slanted surface of the motor housing.

With a motor damping structure for an actuator device as described above, the elastic contacting member provided on the motor support section of the upper actuator case or the lower actuator case contacts against the upper slanted surface or the lower slanted surface of the motor housing when the upper actuator case and the lower actuator case are assembled together, thereby causing the drive motor to be supported in a desired position.

Consequently, when the actuator device is assembled, the drive motor can be fixed inside the casing without using an adhesive tape in the conventional manner and the number of work steps and the number of parts can be reduced.

After assembly, the elastic contacting member undergoes elastic deformation to relieve deformation caused by thermal expansion and vibrations imparted from the upper slanted surface or the lower slanted surface. As a result, excellent support stability can be obtained and the vibration damping effect can be maintained for a long period of time.

BRIEF DESCRIPTION OF THE DRAWINGS

Referring now to the attached drawings which form a part of this original disclosure:

FIG. 3 shows a first embodiment of a motor damping structure for an actuator device. In FIG. 3, (a) is a left side view of an actuator case, (b) is top view of the actuator case, (c) is right side view of the actuator case, and (d) is a cross sectional view taken along the section line A-A of (b).

DETAILED DESCRIPTION OF EMBODIMENTS

Selected embodiments of a motor damping structure for an actuator device will now be explained with reference to FIGS. 1 to 12. It will be apparent to those skilled in the art from this disclosure that the following descriptions of the embodiments are provided for illustration only and not for the purpose of limiting the invention as defined by the appended claims and their equivalents.

Parts that are the same or equivalent to the parts of the conventional device are indicated with the same reference numerals.

Figure 1:
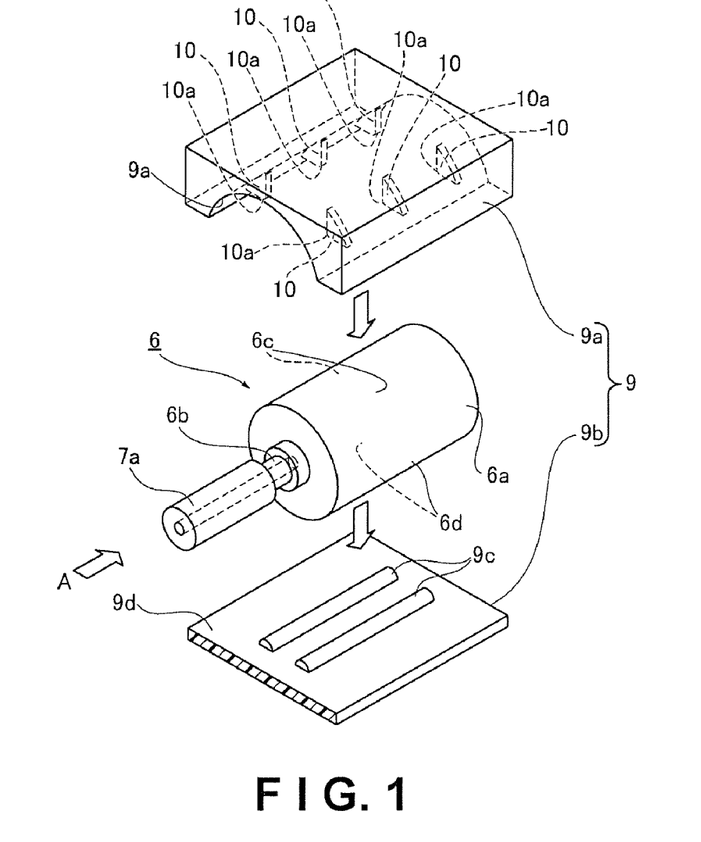
FIG. 1 is a simplified exploded perspective view illustrating a motor damping structure for an actuator device according to an embodiment of the present invention.
Figure 2:
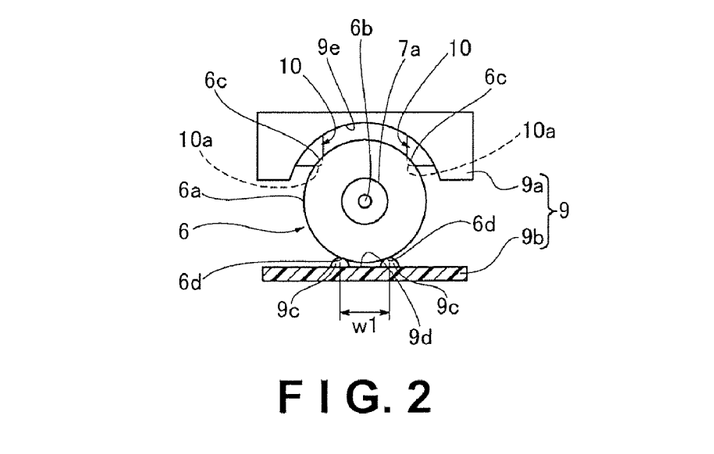
FIG. 2 is a simplified frontal view illustrating a motor damping structure for an actuator device according to an embodiment of the present invention.

Constituent features of a motor damping structure for an actuator device according to a general concept of the present invention will now be explained. As shown in FIG. 1 and FIG. 2, device has a hollow box-shaped casing 9 comprising chiefly an upper actuator case 9a and a lower actuator case 9b that are attached together and made of a resin material containing PP glass.

A pair of lower support ribs 9c and 9c serving as a motor support section is formed integrally on an inside surface 9d of the lower actuator case 9b of the casing 9 and configured to contact and support a generally cylindrical motor housing 6a of a drive motor 6 that is substantially the same as in the aforementioned conventional technology.

As shown in FIG. 2, the lower support ribs 9c and 9c each have a substantially semicircular cross sectional shape and are arranged with a prescribed spacing W1 in-between such that a lengthwise direction thereof is aligned with an extension direction of a motor shaft 6b of the drive motor 6.

Lower slanted surfaces 6d and 6d provided on the motor housing 6a of the drive motor 6 contact the support ribs 9c and 9c such that the motor housing 6a is supported from underneath and a lower edge of the motor housing 6a is separated from the inside surface 9d.

A motor containing recess 9e is formed on an inside surface of the upper actuator case 9a of the casing 9.

Three left-right pairs of elastic contacting members 10 and 10 are provided on the motor containing recess 9e and touch against upper slanted surfaces 6c and 6c of the motor housing 6a so as to form a motor support section that supports the motor housing 6a elastically.

Next, operational effects of the motor damping structure for an actuator device according to the general concept as described above will be explained.

As shown in FIG. 1, with the motor damping structure for an actuator device as described above, the drive motor 6 is mounted between the lower support ribs 9c and 9c and the upper actuator case 9a is attached from above.

Thus, when the upper actuator case 9a is attached to the lower actuator case 9b as shown in FIG. 2, tip ends 10a of the elastic contacting members 10 and 10 (which are formed integrally on the motor containing recess 9e of the actuator case 9a) touch against the upper slanted surface 6c and 6c of the motor housing 6a such that the tip ends 10a and 10a are partially crushed and the drive motor 6 is supported in a desired position.

Consequently, when the actuator device is assembled, the drive motor 6 can be elastically supported and fixed inside the casing 9 without using an adhesive tape in the conventional manner and the number of work steps and the number of parts can be reduced.

Also, as shown in FIG. 2, since the elastic contacting members 10 and 10 contact the upper slanted surfaces 6c and 6c diagonally, a prescribed stroke can be easily ensured such that the motor housing 6a does not bottom out against an upper wall surface of the motor containing recess 9e after the device is assembled.

Thus, the elastic contacting members 10 and 10 relieve vibrations and the like transmitted from the upper slanted surfaces 6c and 6c by undergoing elastic deformation. As a result, excellent support stability can be obtained and the vibration damping effect can be maintained for a long period of time.

First Embodiment

Figure 7:
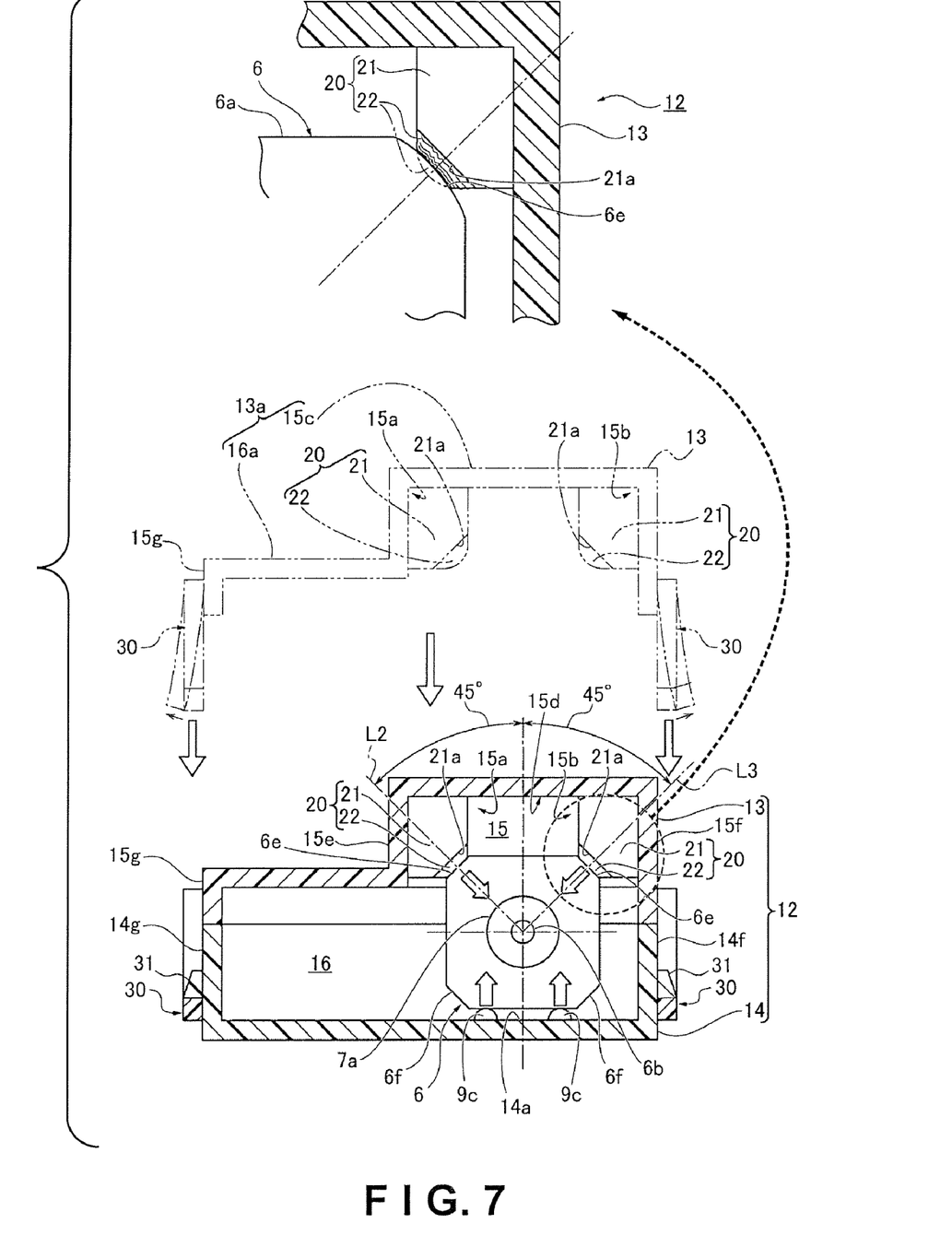
FIG. 7 is a cross sectional view illustrating the upper actuator case being attached to a lower actuator case in the motor damping structure for an actuator device according to the first embodiment of the present invention.
Figure 8:
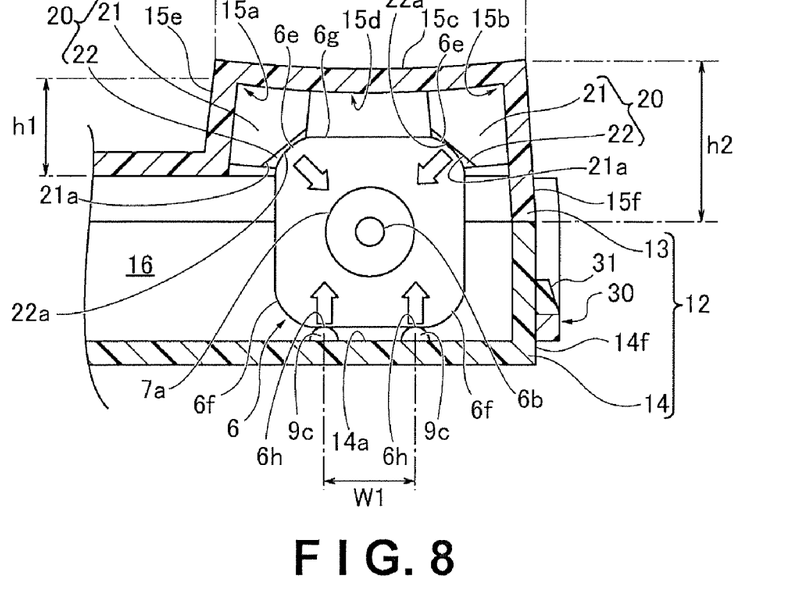
FIG. 8 is a simplified view indicating directions of stresses acting in the motor damping structure for an actuator device according to the first embodiment of the present invention.
Figure 9:
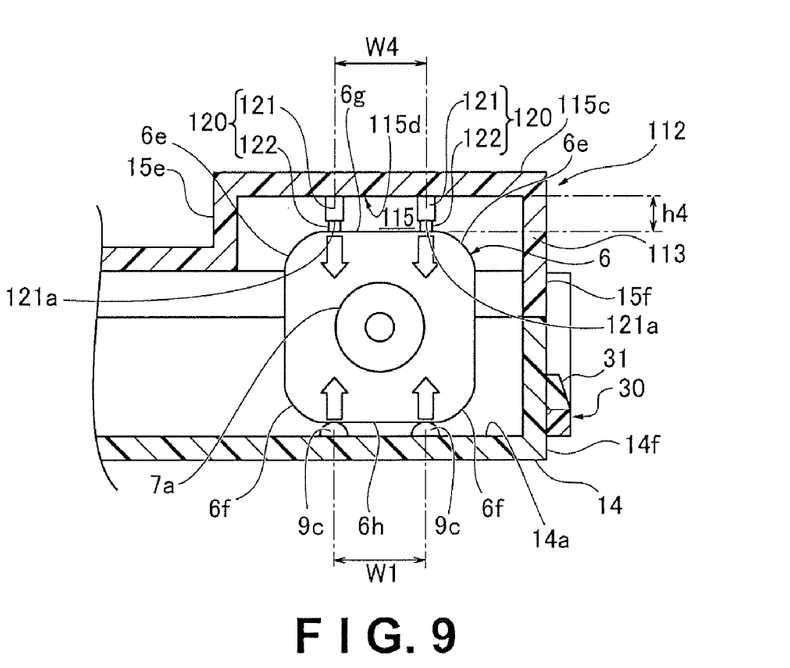
FIG. 9 is a simplified view indicating directions of stresses acting in a comparative example of a motor damping structure for an actuator device according to an embodiment of the present invention.

FIGS. 3 to 8 show a first embodiment of an actuator device motor damping structure, and FIG. 9 shows a comparative example of an actuator device motor damping structure.

Parts that are the same or equivalent to the parts of the embodiment are indicated with the same reference numerals.

Figure 3:
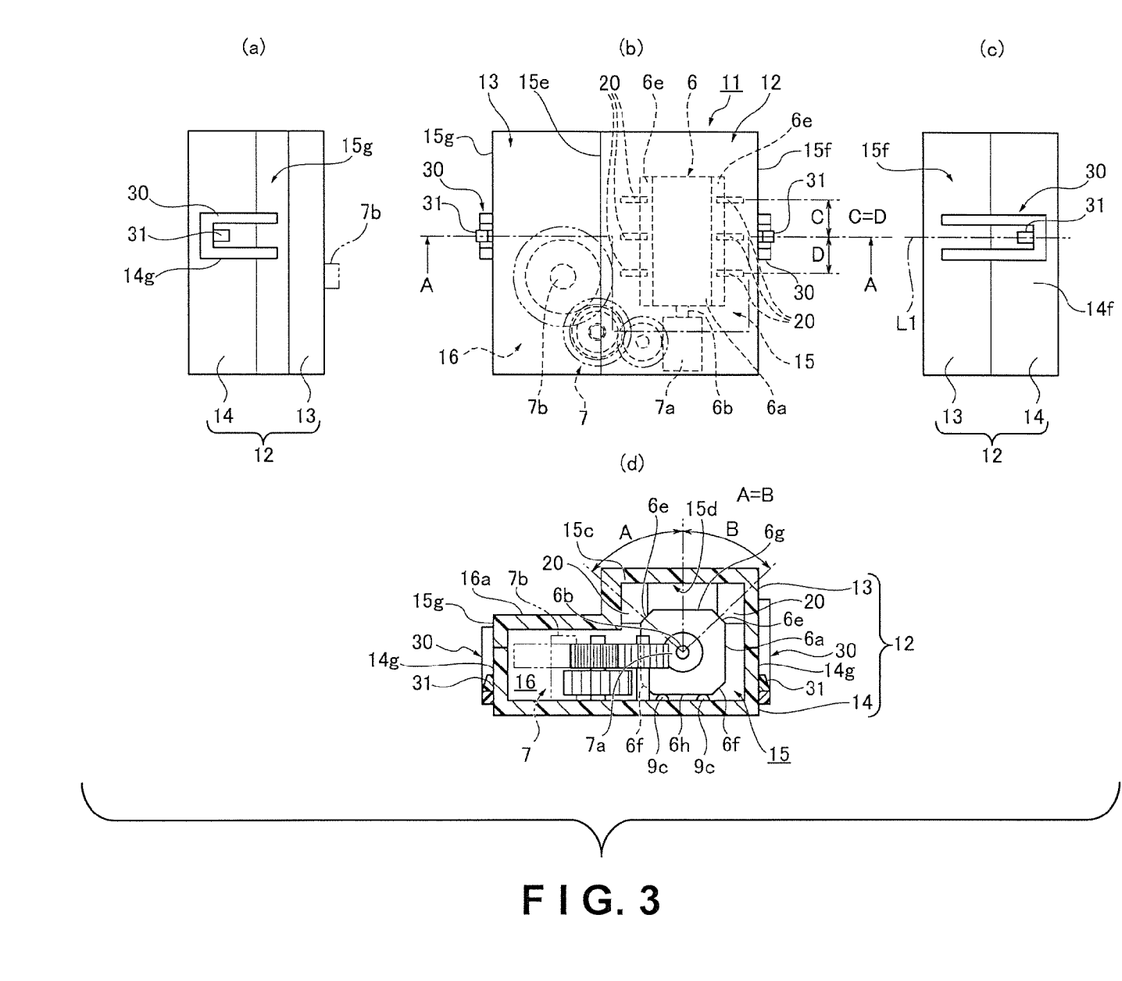

First, the constituent features will be explained. As shown in FIG. 3, in a motor damping structure for an actuator device 11 according to the first embodiment, a casing 12 is made of resin and comprises chiefly an upper actuator case 13 and a lower actuator case 14 attached together.

A drive motor 6 is contained inside the casing 12. The drive motor 6 is a flat type drive motor having a motor shaft 6b disposed between an upper face section 6g and a lower face section 6h on opposite sides of a motor housing 6a. Here, "flat type" means that a flat surfaced portion is formed on at least one or the other of an upper face section and a lower face section of the motor housing. The upper face section 6g and the lower face section 6h form a planar flat surface section having a prescribed surface area. A worm gear 7a is provided on the motor shaft 6b of the drive motor 6. The worm gear 7a forms part of a reduction gear section 7 serving as a power transmitting section for transmitting a torque of the drive motor 6.

A gear containing section 16 is provided inside the casing 12 to contain the reduction gear section 7, and an output shaft 7b of the reduction gear section 7 is provided such that it protrudes in an outward direction from an upper face section 13a of the upper actuator case 13.

A motor containing section 15 is provided inside the case 12 adjacent to the gear containing section 16 containing the reduction gear section 7.

A pair of lower support ribs 9c and 9c serving as a motor support section configured similarly to the previously explained embodiment is formed integrally on an inside surface 14a of the lower actuator case 14 that faces toward the motor containing section 15.

Figure 4:
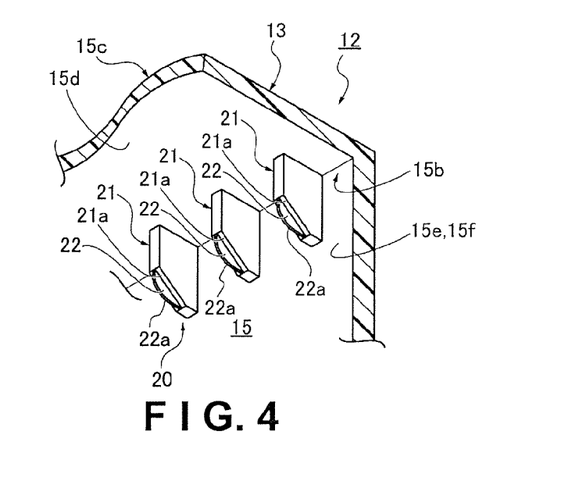
FIG. 4 is a partially cross sectional enlarged perspective view illustrating an inside of an upper actuator case of the motor damping structure for an actuator device according to the first embodiment of the present invention.
Figure 5:
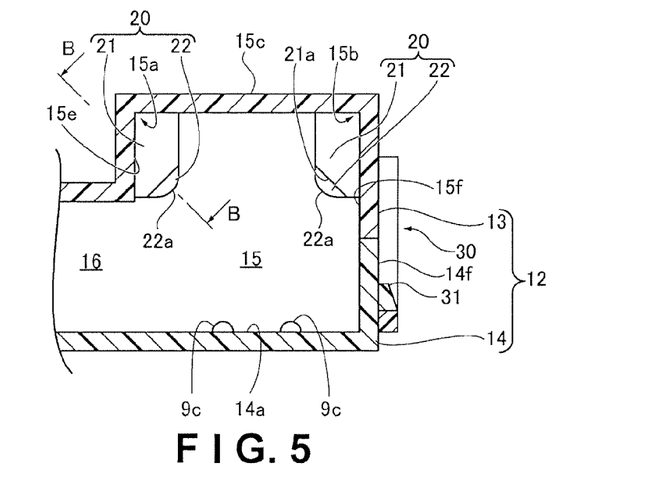
FIG. 5 is a cross sectional view illustrating the actuator case of the motor damping structure for an actuator device according to the first embodiment of the present invention with the motor removed.
Figure 6:
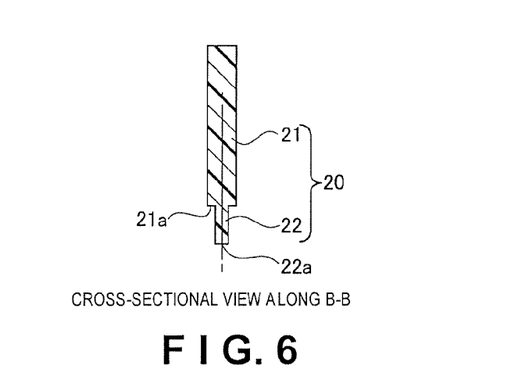
FIG. 6 is an enlarged cross sectional view of the motor damping structure for an actuator device according to the first embodiment of the present invention taken along the section line B-B of FIG. 5.

In the first embodiment, as shown in FIGS. 4 to 6, a plurality of crush ribs 20 and 20 is provided on an under surface 15d of the upper face section 15c (the top wall) of the upper actuator case 13 forming the motor support section. The crush ribs 20 and 20 are provided in left and right corner sections 15a and 15b of the space inside the motor containing section 15 and protrude toward the inside surface 14a of the lower actuator case 14.

In the first embodiment, the crush ribs 20 and 20 provided as three left-right pairs arranged at equal intervals along a direction in which the motor shaft 6b extends (C=D in FIG. 3(b)). A pair of substantially flat upper slanted surfaces 6e and 6e or a pair of substantially flat lower slanted surfaces 6f and 6f is formed in a chamfered shape (R-chamfered shape in the drawings) on left and right side edges of the upper face section 6g or the lower face section 6h that correspond to left and right edges in a frontal view of the motor housing 6a. When the upper actuator case 13 and the lower actuator case 14 are attached together with a motor contained inside, the crush ribs 20 and 20 contact the upper slanted surfaces 6e and 6e.

As shown in FIG. 4, the crush ribs 20 of the first embodiment are provided so as to protrude from corner sections 15a and 15b of the upper actuator case 13 and each has a reinforcing rib 21 that is provided as an integral unit with the upper actuator case 13 and spans between the under surface 15d of the upper face section 15c and a left or right side face section 15e or 15f (the first or second side wall).

A slanted surface 21a is formed on each of the reinforcing ribs 21. A thin plate-like elastic contacting member 22 is provided so as to protrude from each of the slanted surfaces 21a. With this arrangement, a distance to an inside surface of the casing positioned above the motor housing 6a can be maintained and the elastic contacting member 22 can be arranged to protrude from a position close to the motor housing 6a. Thus, since the elastic contacting member 22 has the form of a thin plate, the elastic contacting member 22 can contact the motor housing 6a elastically in a reliable manner without bending over in an outward direction within a plane and losing its elastic reaction force. As a result, the thin plate-like elastic contacting member 22 can easily return to the position where contact began and, for example, the possibility of a gap occurring due to thermal expansion can be reduced. Additionally, excellent support stability can be obtained.

As shown in FIG. 7, in the first embodiment, the slanted surfaces 21a and 21a of the left-right pairs of reinforcing ribs 21 and 21 are slanted at approximately 45-degree angles such that they face toward the motor shaft 6b of the drive motor 6. The elastic contacting members 22 and 22 are formed in symmetrical positions on the left and right and each has a thickness dimension of approximately 0.5 mm. When the casing is assembled, the elastic contacting members 22 and 22 contact the upper slanted surfaces 6c and 6c of the drive motor 6 starting from the semicircular arc-shaped tip end portions 22a and 22a shown in FIG. 4. As shown in FIG. 8, pressing forces oriented diagonally at approximately 45-degree angles act against the tip end portions 22a and 22a and the tip end portions 22a and 22a are each crushed starting at a portion where the area of a cross section perpendicular to the pressure direction is small.

Also, in the first embodiment, the structure is contrived such that if extension lines L2 and L3 are set to extend at approximately 45-degree angles to the left and right from the motor shaft 6b so as to pass through a center of the left and right crush ribs 20 and 20, then the extension lines L2 and L3 do not pass through the apexes of the left and right corner sections 15a and 15b but instead pass through positions on the left and right side face sections 15e and 15f.

In the first embodiment, as shown in FIG. 3, the latching members 30 and 30 that latch when the upper actuator case 13 and the lower actuator case 14 are attached together are provided on a left side face section 15g and a right side face section 15f constituting outside face portions of the case such that the latching members 30 and 30 are positioned on an extension line L1 passing through a middle pair of crush ribs 20 and 20 (i.e., middle along a direction in which the motor shaft 6b extends) among the crush ribs 20 forming the motor support section of the upper actuator case 13.

Latching claws 31 and 31 configured to engage with the latching members 30 and 30 are protrudingly provided on a left side face portion 14g and a right side face portion 14f of the lower actuator case 14 as shown in FIG. 7.

The latching members 30 and 30 are contrived such that a direction in which they can undergo elastic deformation is aligned with the extension line L1 and they can spread open to the left and right directions from the perspective of FIG. 3(b).

As shown in FIG. 8, in the first embodiment a width dimension W2 of the upper face section 15c of the motor containing section 15 is set to be larger than a height dimension h1 of the left side face section 14g and a height dimension h2 of the right side face section 14f.

A coefficient of linear expansion of the resin material from which the casing 12 is made is set to be larger than a coefficient of linear expansion of an iron or other metal material from which the motor housing 6a of the drive motor 6 is made.

Comparative Example

FIG. 9 shows a comparative example of a motor damping structure for an actuator device.

Parts that are the same or equivalent to the parts of the first embodiment are indicated with the same reference numerals.

In the casing 112 of the comparative example, left-right pairs of crush ribs 120 and 120 are provided on a motor containing section 115 of an upper actuator case 113. The pairs of crush ribs 120 and 120 protrude substantially vertically from an under surface 115d of an upper face section 115c of the motor containing section 115 so as to have a prescribed height dimension h4.

In this comparative example, each of the left-right pairs of crush ribs 120 and 120 has a pair of horizontal reinforcing ribs 121 and 121 arranged with a prescribed spacing w4 in-between that is substantially equal to the spacing w1 between the lower support ribs 9c and 9c.

A thin plate-like elastic contacting member 122, 122 is provided as an integral part of each of the horizontal reinforcing ribs 121 and 121 and protrudes downward from a bottom surface 121a, 121a of the reinforcing ribs 121 and 121. When the upper actuator case 13 and the lower actuator case 14 are attached together, the elastic contacting members 122 contact the upper face section 6g in a frontal view of the motor housing 6a.

Next, operational effects of the motor damping structure for an actuator device according to the comparative example will be explained.

In the casing 112 of this comparative example, the resin material from which the upper actuator case 113 and the lower actuator case 14 of the casing 112 are made has a larger coefficient of linear expansion than the metal material from which the motor housing 6a of the drive motor 6 is made.

Consequently, when the casing 112 and the drive motor 6 have a comparatively low temperature, such as when the actuator device is driven in an environment having a lower ambient temperature than normal, a spacing between the under surface 115d of the upper actuator case 113 and the inside surface 14a of the lower actuator case 14 shrinks more than an external dimension of the motor housing 6a shrinks and a stress develops which acts to contract the height dimension h4 of the crush ribs 120 and 120 in a height direction.

Thus, the elastic contacting members 122 and 122 are smashed to a larger degree and the tip end positions of the elastic contacting members 122 and 122 are pushed farther upward than during a normal temperature condition, rendering the possibility that the elastic contacting members 122 and 122 will be crushed to such a position that it is difficult for them to recover elastically.

If the elastic contacting members 122 and 122 are smashed by a large amount, then a gap will develop between the tip ends of the elastic contacting members 122 and 122 and the upper face section 6g of the motor housing 6a and the vibration damping effect will be degraded when the temperature returns to a normal temperature or rises to a comparatively high temperature.

Meanwhile, when the casing 112 and the drive motor 6 have a comparatively high temperature, such as when the actuator device is driven in an environment having a higher ambient temperature than normal, a spacing between the under surface 115d of the upper actuator case 113 and the inside surface 14a of the lower actuator case 14 widens more than an external dimension of the motor housing 6a widens and the height dimension h4 of the crush ribs 120 and 120 appears to increase in a lengthwise direction.

Consequently, a gap develops or the amount by which the tip ends of the elastic contacting members 122 and 122 are smashed changes such that a holding strength with which the drive motor 6 is held inside the casing 112 declines, thereby incurring the possibility that the vibration damping effect will be degraded.

Conversely, with the first embodiment of the present invention, the upper actuator case 13 and the lower actuator case 14 are attached together in a vertical direction and the latching members 30 and 30 latch onto the left and right latching claws 31 and 31. This results in an assembled state in which the drive motor 6 is held inside the casing 12.

In this assembled state, the tip ends of the elastic contacting members 122 and 122 contact the upper slanted surfaces 6e and 6e of the drive motor 6 incur stresses acting in directions oriented at 45-degree angles to the left and right, respectively, from the motor shaft 6b.

Thus, the stresses act mainly in portions below the corner sections 15a and 15b (see single-dot chain line in FIG. 7) and the left and right side face sections 15e and 15f of the motor containing section 15 flex such that a lower portion opens outward. Meanwhile the upper face section 15c flexes such that it bulges downward because its left and right edges are connected to the left and right side face sections 15e and 15f at the corner sections 15a and 15b, which are strengthened by the reinforcing ribs 21 and 21.

With the casing 12 of the first embodiment, the upper face section 15c can flex downward readily because the width dimension W2 of the upper face section 15c is set to be larger than the height dimensions h1 and h2 of the left and right side face sections 15e and 15f of the motor containing section 15.

The free ends, i.e., the lower ends, of the latching members 30 and 30 spread open to the left and right directions from the perspective of FIG. 3(b).

In the first embodiment, the latching members 30 and 30 are provided on the left side face section 15g and the right side face section 15f (which correspond to a case outside face section) in positions lying on an extension line L1 that passes through the pair of crush ribs 20 and 20 that are aligned with the middle of the latching claws 31. As a result, stresses are transmitted effectively and stresses can be absorbed by bending deformation of the latching members 30 and 30 about these latching points.

Next, operational effects of the motor damping structure for an actuator device according to the first embodiment will be explained.

With the casing 12 of the first embodiment, the same strength can be achieved with a smaller thickness dimension because the upper actuator case 13 and the lower actuator case 14 of the casing 12 are made of a resin material containing PP glass.

Consequently, the weight can be reduced and cracking and crumbling are unlikely to occur even if the coefficient of linear expansion is larger than the coefficient of linear expansion of the metal material from which the motor housing 6a of the drive motor 6.

When the casing 12 and the drive motor 6 have a comparatively low temperature, such as when the actuator device is driven in an environment having a lower ambient temperature than normal, a spacing between the under surface 15d of the upper actuator case 13 and the inside surface 14a of the lower actuator case 14 shrinks more than an external dimension of the motor housing 6a shrinks.

Thus, as the elastic contacting members 22 and 22 of the crush ribs 20 and 20 are crushed and the upper face section 15c undergoes flexing deformation such that it bulges downward, the free ends of the latching members 30 and 30 spread open to the left and right such that the latched latching members 30 and 30 can undergo bending deformation. As a result, stress can be readily absorbed by allowing lower portions of the left and right side face sections 15e and 15f to flex outward apart from each other.

In this way, even under a temperature condition lower than a normal temperature, the tip end positions of the elastic contacting members 22 and 22 do not get pushed upward and become crushed to a position where they cannot easily recover elastically.

Meanwhile, when the casing 12 and the drive motor 6 have a comparatively high temperature, such as when the actuator device is driven in an environment having a higher ambient temperature than normal, a spacing between the under surface 15d of the upper actuator case 13 and the inside surface 14a of the lower actuator case 14 enlarges more than an external dimension of the motor housing 6a enlarges.

However, the tip ends of the elastic contacting members 22 and 22 of the crush ribs 20 and 20 recover elastically while pointing in a diagonally downward direction and continuing to contact the upper slanted surfaces 6e and 6e of the motor housing 6a, thereby suppressing a decrease of the holding strength.

Also, if an excessive stress is applied while under a low temperature condition, then the stress is absorbed by flexing deformation of the upper face section 15c and the left and right side face sections 15e and 15f. As the stress is relieved, the sections recover from the flexing deformation due to elastic stress.

Consequently, the contact of the tip ends of the elastic contacting members 22 and 22 against the upper slanted surfaces 6e and 6e of the motor housing 6a can be maintained reliably and a decline in the holding strength can be suppressed.

As explained above, with an actuator device motor damping structure according the first embodiment, the elastic contacting members 22 and 22 provided on the crush ribs 20 and 20 of the upper actuator case 13 or the lower actuator case 14 contact the upper slanted surfaces 6e and 6e of the motor housing 6a when the upper actuator case 13 and the lower actuator case 14 are attached together. In this way, the drive motor 6 is supported in a desired position inside the motor containing section 15.

Consequently, when the actuator device 11 is assembled, the drive motor 6 can be fixed inside the casing 12 without using an adhesive tape in the conventional manner and the number of work steps and the number of parts can be reduced.

After assembly, the elastic contacting members 22 and 22 undergo elastic deformation to relieve deformation caused by thermal expansion and vibrations imparted from the upper slanted surfaces 6c and 6c. As a result, excellent support stability can be obtained and the vibration damping effect can be maintained for a long period of time.

With the flat type drive motor 6 of the first embodiment, the upper slanted surfaces 6c and 6c of the motor housing 6a are pressed by the total of six elastic contacting members 22 and 22 such that the motor housing 6a is supported and fixed in place.

The upper slanted surfaces 6e and 6e or the lower slanted surfaces 6f and 6f of the motor housing 6a are formed by chamfering left and right side edges of the upper face section 15c or a lower face section into substantially flat surfaces oriented at 45-degree angles to the left and right. As a result, a reaction torque caused by the rotational drive does not easily cause the motor housing 6a to move in a direction of rolling over. Therefore, an even better support stability can be obtained.

Moreover, since the tip ends of the elastic contacting members 22 and 22 have a circular arc shape, substantially the same pressing force can be applied from the left and right toward the motor shaft 6b even if the point-of-contact positions are uneven in the planes of the upper slanted surfaces 6e and 6e.

As a result, an even better support stability can be obtained.

Additionally, the left and right corner sections 15a and 15b of the upper actuator case 13 are reinforced by the reinforcing ribs 21 and 21 provided on the crush ribs 20 and 20.

As a result, stresses and vibrations imparted to the elastic contacting members 22 and 22 are transmitted through the reinforcing ribs 21 and 21 to the casing 12 and absorbed efficiently by flexing deformation of the upper face section 15c and the left and right side face sections 15e and 15f of the casing 12.

The thin plate-like elastic contacting members 22 and 22 protrude from the slanted surfaces 21a of the reinforcing ribs 21 and support the drive motor 6 by contacting the upper slanted surfaces 6e and 6e of the motor housing 6a from the left and right at diagonally 45-degree angles.

Consequently, as shown in FIG. 7, a distance to an inside surface, i.e., the under surface 15d, of the upper actuator case 13 positioned above the motor housing 6a can be maintained and the elastic contacting members 22 and 22 can be arranged to protrude from a position close to the motor housing 6a. Thus, since the elastic contacting members 22 and 22 have the form of thin plates, the elastic contacting members can contact elastically in a reliable manner without bending over in an outward direction within a plane and losing their elastic reaction forces.

As a result, the thin plate-like elastic contacting members 22 and 22 can easily return to the position where contact began and, for example, the possibility of a gap occurring due to thermal expansion can be reduced. Additionally, excellent support stability can be obtained.

By merely attaching the upper actuator case 13 in which the crush ribs 20 and 20 are provided and the lower actuator case 14 together and latching the latching members 30 and 30 to the latching claws 31 and 31, the drive motor 6 is supported and fixed in place inside the casing 12 by the crush ribs 20 and 20.

As shown in FIG. 3, the latching members 30 and 30 are provided on the left side face section 15g and the right side face section 15f (corresponding to a case outside face section mentioned in the claims) so as to be positioned on an extension line L1 passing through a middle pair of crush ribs 20 and 20, i.e., middle along a direction in which the motor shaft 6b extends.

Consequently, when the casing 12 undergoes flexing deformation, the latching members 30 and 30 also undergo elastic deformation and do not inhibit the flexing deformation of the casing 12.

As a result, a displacement absorbing amount and a vibration absorbing amount of the casing 12 can be increased without causing the latched state achieved with the latching claws 31 and 31 near the bottom ends of the latching members 30 and 30 servings as fulcra or a support point to become released, excellent support stability of the drive motor 6 can be achieved, and the vibration damping effect can be maintained for a long period of time.

Second Embodiment

Figure 10:
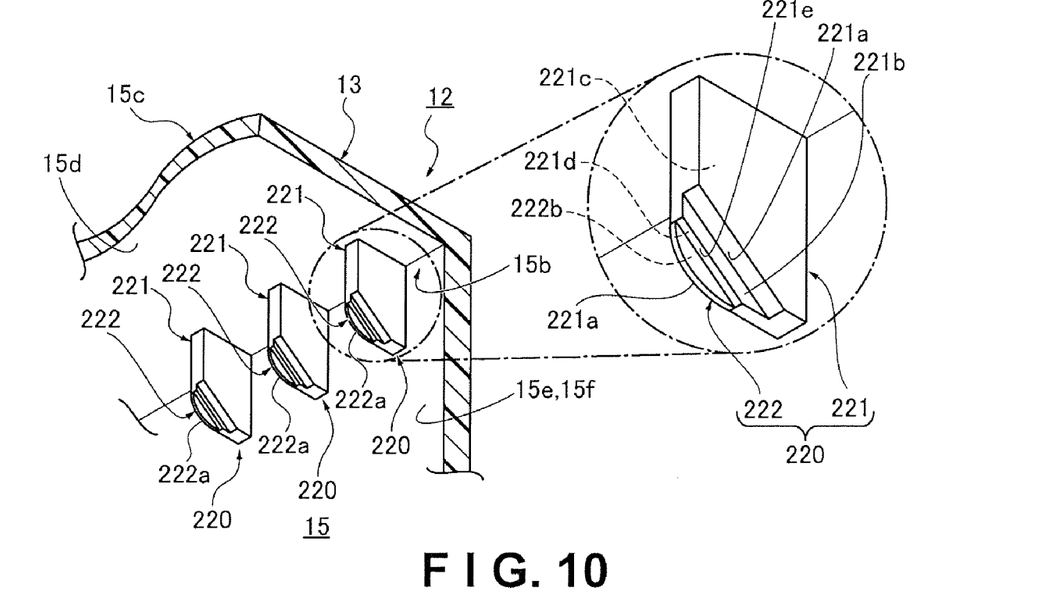
FIG. 10 is a partially cross sectional enlarged perspective view illustrating an inside of an upper actuator case of a second embodiment of a motor damping structure for an actuator device according an embodiment of the present invention.
Figure 11:
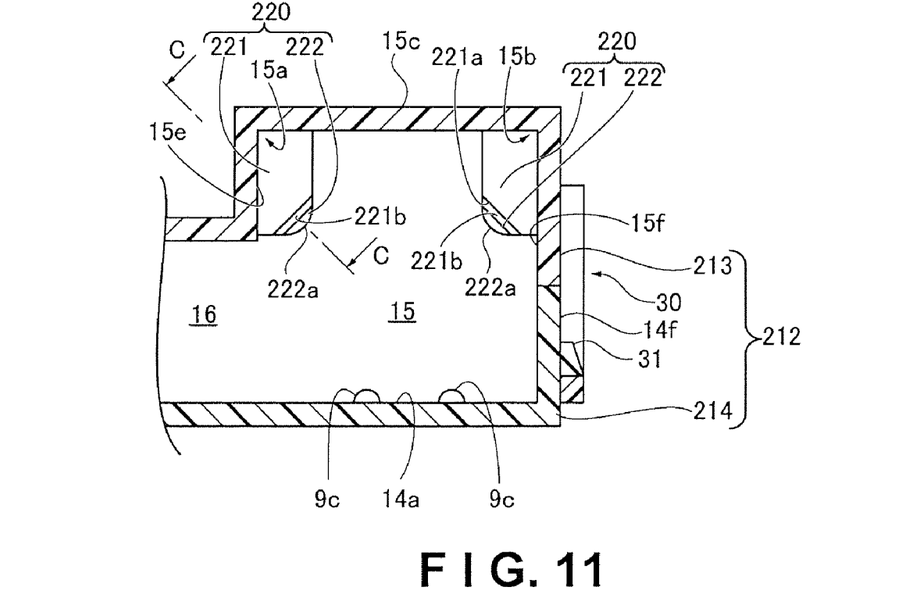
FIG. 11 is a cross sectional view illustrating the actuator case of the motor damping structure for an actuator device according to the second embodiment of an embodiment of the present invention with the motor removed.
Figure 12:
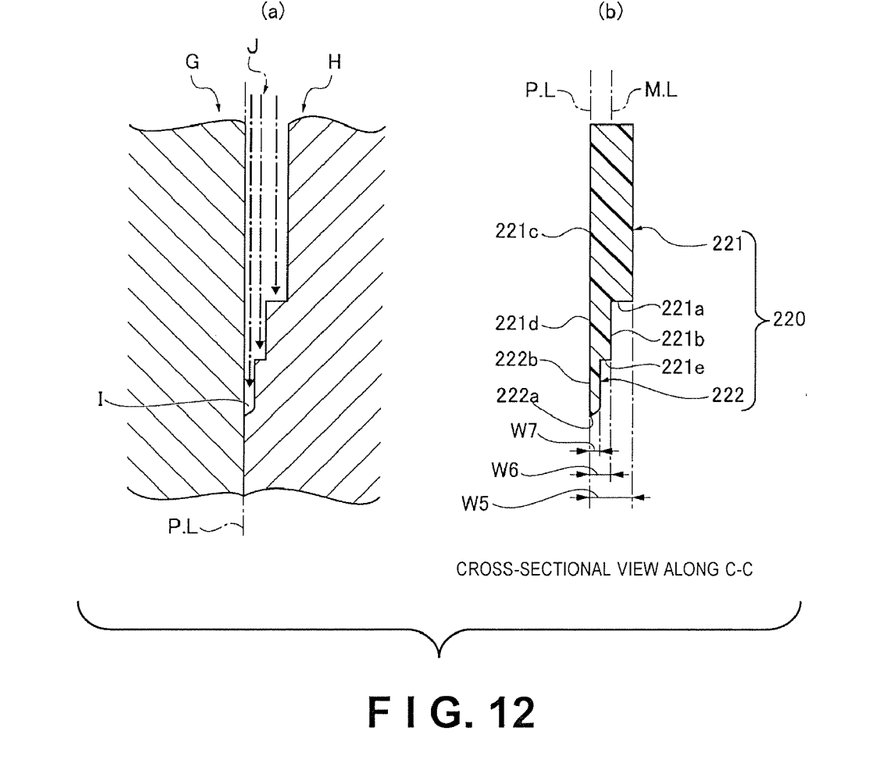
FIG. 12 shows cross sectional views of the motor damping structure for an actuator device according to the second embodiment of an embodiment of the present invention. In the figure, (a) is a cross sectional view illustrating a die parting line at a position corresponding to a section line C-C of FIG. 11 and (b) is an enlarged cross sectional view taken along the section line C-C of FIG. 11.

Referring now to FIGS. 10 to 12, a motor damping structure for an actuator device in accordance with a second embodiment will now be explained. The second embodiment is a variation of the first embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment of the motor damping structure for an actuator device, crush ribs 220 and 220 are provided on an under surface 15d of the upper face section 15c of an upper actuator case 213 forming a casing 212. The crush ribs 20 and 20 are provided in left and right corner sections 15a and 15b and serve as motor support sections.

The crush ribs 220 and 220 are formed as integral portions of the upper actuator case 213 and protrude toward the inside surface 14a of the lower actuator case 14 within the space of the motor containing section 15.

In the second embodiment, as shown in FIGS. 10 and 11, there are three left-right pairs of crush ribs 220 and 220 arranged with equal spacing in-between along a direction in which the motor shaft 6b extends.

When the upper actuator case 213 and the lower actuator case 214 have been attached together and the drive motor 6 (not shown) is contained inside the casing 212, tip end portions of the crush ribs 220 and 220 touch against the upper slanted surfaces 6e and 6e in a diagonal direction. The upper slanted surfaces 6e and 6e are a substantially flat pair of surfaces formed in a chamfered shape on left and right side edges of the upper face section 6g in a frontal view of the motor housing 6a. The motor housing also includes a pair of lower slanted surfaces 6f and 6f on the lower face section 6h.

As shown in FIG. 11, the crush ribs 220 of the second embodiment are provided to protrude from corner portions 15a and 15b of the upper actuator case 13 and each has a reinforcing rib 221 that is provided as an integral portion of the upper actuator case 13 and spans between the under surface 15d of the upper face section 15c and a left or right side face section 15e or 15f.

A slanted surface 221a is formed on each of the reinforcing ribs 221. As shown in FIG. 11, a trapezoidal seat section 221b having a substantially trapezoidal shape protrudes from the slanted surface 221a of each of the reinforcing ribs 221. As shown in FIG. 12, the trapezoidal seat sections 221b are formed as integral portions of the reinforcing ribs 221 and have a thickness dimension W6 that is smaller than a thickness dimension W5 of the reinforcing ribs 221.

With the trapezoidal seat sections 221b of the second embodiment, a side face 221d is provided such that it lies in the same plane in a width direction as the side face 221c of the reinforcing rib 221.

An elastic contacting member 222 having a generally semicircular shape in a side view is provided on the lower slanted surface 221e of each trapezoidal seat section 221b. The elastic contacting member 222 has the form of a thin plate with a thickness dimension of approximately 0.5 mm and is formed as an integral portion of the crush rib 220.

In the second embodiment, as shown in FIG. 10, the slanted surfaces 221a and 221a of the left-right pairs of reinforcing ribs 221 and 221 are oriented at approximately 45-degree angles so as to face toward the motor shaft 6b of the drive motor 6 and are formed in symmetrical positions on the left and right.

The trapezoidal seat sections 221b and 221b formed integrally on the slanted surfaces 221a and 221a have slanted surfaces 221e and 221e that, similarly, are oriented at approximately 45-degree angles so as to face toward the motor shaft 6b of the drive motor 6.

The semicircular arc-shaped tip end sections 222a and 222a of the elastic contacting members 222 and 222 have a thickness dimension of approximately 0.5 mm and are configured to have a pointed shape facing downward in a cross sectional view, as shown in FIG. 12.

Consequently, when the casing is being assembled and tip end sections 222a and 222a of the elastic contacting members 222 and 222 contact the upper slanted surfaces 6c and 6c of the drive motor 6, pressing forces oriented diagonally at approximately 45-degree angles act against the tip end portions 222a and 222a and the tip end portions 222a and 222a are crushed starting at portions where the area of a cross section perpendicular to the pressing direction is small.

In the second embodiment, a side face 221c of a reinforcing rib 221, a side face 221d of the trapezoidal seat section 221b, and a side face 222b of the elastic contacting member 222 spanning to the tip end section 222a are provided such that they lie in the same plane in a width direction.

As shown in FIG. 12, in a crush rib 220 according to the second embodiment, a parting line P.L. is positioned to be offset toward the side face 222c in a thickness direction with respect to a thickness-direction center line M.L.

Next, operational effects of the motor damping structure for an actuator device according to the second embodiment will be explained.

The motor damping structure for an actuator device according to the second embodiment achieves operational effects in addition to the operational effects achieved by the previously explained embodiment and the first embodiment. Firstly, regarding the process of molding the casing 212, the upper and lower actuator cases 213 and 214 of the casing 212 are injection molded using mated dies G and H as shown in FIG. 12(a).

The upper actuator case 213 is formed such that the parting line P.L. lies in the same plane as the side face 221c of the reinforcing rib 221, the side face 221d of the trapezoidal seat section 221b, and the side face 222b of the elastic contacting member 222. Thus, a complex shape can be formed using mating dies G and H having a comparatively simply shaped cavity I.

When the mating dies G and H are closed and a molten resin J serving as the material for making the casing 212 is injected therein, the flow resistance against the molten resin J is small in a flow direction because the side faces 221c, 221d, and 222b are substantially in the same plain as shown in FIG. 12(a).

As a result, the molten resin J can flow fully into the depth of the cavity I forming the tip end section 222a, i.e., the inner portion forming the tip end section 222a, of the thin-walled elastic contacting member 222

Additionally, the parting line P.L. is provided in a position corresponding to the tip end sections 222a of the elastic contacting members 222 and 222.

Consequently, gas can escape readily from between the mating dies G and H and the molten resin can spread fully into the narrow portion forming the pointed tip end section 222a. As a result, the precision of the shape of the mating molds G and H can be imparted to the precision of the shapes of the elastic contacting members 222 of the thin-walled crush ribs 220 of the upper actuator case 213.

During assembly, the injection molded upper and lower actuator cases 213 and 214 are attached together to form the casing 212, which has a motor containing section 15 inside that contains the drive motor 6.

Consequently, when the elastic contacting members 222 and 222 contact the upper slanted surfaces 6c and 6c of the drive motor 6, pressing forces oriented diagonally at approximately 45-degree angles act against the tip end portions 222a and 222a and the tip end portions 222a and 222a are crushed starting at portions where the area of a cross section perpendicular to the pressing direction is small.

Thus, with the second embodiment, after all of the pointed tip end sections 222a have been crushed, the semicircular arc shaped elastic contacting members 222 and 222 are crushed one by one until the upper slanted surfaces 6e and 6e of the drive motor 6 reach the trapezoidal seat sections 221b.

As a result, it is less likely that all of the elastically deformed portions will be crushed and lose an elastic reaction force due to a single temporary pressing force caused by a vibration or the like, excellent support stability can be obtained, and the vibration damping effect can be maintained for a long period of time.

An embodiment and first and second embodiments of a motor damping structure for an actuator device are explained herein with reference to the drawings. However, the specific constituent features of the motor damping structure for an actuator device are not limited to those of the first and second embodiments. Design modifications can be made without departing from the scope of the invention and such modifications are included in the invention.

For example, the invention is not limited to providing three pairs, i.e., a total of six, crush ribs 20 and 20 or 220 and 220 in the upper actuator case 13 or the casing 12 as is done in the embodiment and the first and second embodiments. Instead, it is acceptable to provide the crush ribs 20 and 20 in the lower actuator case 14 or in both the upper and lower actuator cases 13 and 14. There are no particular limitations on the positioning, shape, number, and material of the crush ribs 20 so long as they have an elastic contacting member(s) 22 protrudingly provided such that it contacts an upper slanted surface 6c or 6e or a lower slanted surface 6d or 6f of the motor housing 6a.

Although the crush ribs 20 that contact the upper slanted surfaces 6c and 6e of the drive motor 6 are slanted to the left and right at 45-degree angles, the invention is not limited to such an arrangement. It is acceptable for the crush ribs 20 to contact the motor housing 6a at any position and from any angle so long as they contact upper slanted surfaces 6c and 6e provided on left and right side edges of an upper face section 6g of the motor housing 6a or lower slanted surfaces 6d and 6f provided on left and right side edges of a lower face section.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a actuator device when the device is oriented as shown in FIG. 3. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A motor damping structure for an actuator device comprising:
   a motor housing including a drive motor therein; and
   a casing including an upper actuator case and a lower actuator case to accommodate the motor housing therebetween, the casing including a motor support section formed integrally in at least one of the upper actuator case and the lower actuator case to support the drive motor by contacting an outside surface of the motor housing, the motor support section having an elastic contacting member protruding from the at least one of the upper actuator case and the lower actuator case to contact one of an upper slanted surface and a lower slanted surface of the motor housing,
   at least one of an upper face section and a lower face section of the motor housing having a generally flat surface, and the one of the upper slanted surface and the lower slanted surface of the motor housing is a chamfered shape surface disposed adjacent to the flat surface.

2. The motor damping structure for an actuator device as recited in claim 1, wherein
   the motor support section has a reinforcing rib formed integrally on a corner section of the at least one of the upper actuator case and the lower actuator case, and the elastic contacting member is a thin plate member protruding from a slanted surface of the reinforcing rib.

3. The motor damping structure for an actuator device as recited in claim 2, wherein
   the elastic contacting member has a thickness that is smaller than the reinforcing rib.

4. The motor damping structure for an actuator device as recited in claim 2, wherein
   the reinforcing rib has a seat section including the slanted surface, with the seat section having a thickness smaller than a thickness of the reinforcing rib and larger than a thickness of the elastic contacting member.

5. The motor damping structure for an actuator device as recited in claim 2, wherein
   a surface of the reinforcing rib is substantially flush with a surface of the elastic contacting member.

6. The motor damping structure for an actuator device as recited in claim 1, wherein
   the motor support section is disposed between a top wall and a first side wall of the upper actuator case and between the top wall and a second side wall of the upper actuator case facing the first side wall, and a distance between the first side wall and the second side wall of the upper actuator case is larger than a height of the first side wall or the second side wall.

7. A motor damping structure for an actuator device comprising:

a motor housing including a drive motor therein;

a casing including an upper actuator case and a lower actuator case to accommodate the motor housing therebetween, the casing including a motor support section formed integrally in at least one of the upper actuator case and the lower actuator case to support the drive motor by contacting an outside surface of the motor housing, the motor support section having an elastic contacting member protruding from the at least one of the upper actuator case and the lower actuator case to contact one of an upper slanted surface and a lower slanted surface of the motor housing, the motor support section further having an additional elastic contacting member protruding from the at least one of the upper actuator case and the lower actuator case, the additional elastic contacting member being disposed on an opposite side from the elastic contacting member with respect to the motor housing; and a latching member that latches the upper actuator case and the lower actuator case together, the latching member being coupled to an exterior surface of the casing and positioned on an extension line of a straight line passing through both the elastic contacting member and the additional contacting member such that the latching mechanism elastically deforms in a direction along the extension line.

* * * * *